United States Patent [19]
Roberts

[11] 3,940,528
[45] *Feb. 24, 1976

[54] RIGID PLASTICS TILE WITH TEXTURED SURFACE

[76] Inventor: Arthur H. Roberts, 12 Lynnwood Drive, Westbury, N.Y. 11590

[ * ] Notice: The portion of the term of this patent subsequent to Oct. 7, 1985, has been disclaimed.

[22] Filed: Dec. 17, 1971

[21] Appl. No.: 209,176

Related U.S. Application Data

[60] Division of Ser. No. 22,117, March 30, 1971, abandoned, which is a continuation of Ser. No. 526,605, Feb. 10, 1966, abandoned, which is a continuation-in-part of Ser. Nos. 455,764, May 14, 1965, Pat. No. 3,405,026, and Ser. No. 475,989, July 30, 1965, Pat. No. 3,414,456, and Ser. No. 523,778, Jan. 28, 1966, Pat. No. 3,419,455, and Ser. No. 526,667, Feb. 7, 1966, Pat. No. 3,420,729, said Ser. Nos. 455,764, Ser. No. 475,989, Ser. No. 523,778, and Ser. No. 525,667 being a continuation-in-part of Ser. No. 22,002, Apr. 13, 1960, abandoned.

[52] U.S. Cl. ............... 428/161; 428/220; 428/192
[51] Int. Cl.² ............................................. B32B 1/00
[58] Field of Search ........... 161/160, 164, 165, 125, 161/138, 41, 116, 119, 120, 413, 7, 36, 121, 129, 135, 166, 413; 52/316, 390, 392, 384, 386, 388, 389, 518, 519, 528, 537, 554, 555, 560; 156/219, 220, 196, 212, 214, 222, 245; 264/303, 305, 308, 250, 255, 161, 263, 293, 319, 322, 330, 331

[56] References Cited
UNITED STATES PATENTS

| | | | |
|---|---|---|---|
| 1,814,532 | 7/1931 | Sutherland | 156/214 |
| 2,144,388 | 1/1939 | Quasebarth | 18/61 |
| 2,235,148 | 3/1941 | Gartrell | 18/59 |
| 2,537,126 | 1/1951 | Francis | 156/220 X |
| 2,748,042 | 5/1956 | Borgese | 161/254 |
| 2,765,248 | 10/1956 | Beech et al. | 161/119 |
| 2,797,179 | 6/1957 | Reynolds et al. | 154/110 |
| 2,867,263 | 1/1969 | Bartlett | 154/26 |
| 2,934,399 | 4/1960 | Morse | 161/119 |
| 2,940,887 | 6/1960 | Daly et al. | 161/165 X |
| 2,959,511 | 11/1960 | Finger | 161/DIG. 4 |
| 3,003,576 | 10/1961 | Dodge | 156/196 X |
| 3,012,926 | 12/1961 | Wintermute et al. | 156/219 X |
| 3,034,944 | 5/1962 | Chipman | 154/535 |
| 3,036,945 | 5/1962 | Souza | 161/120 X |
| 3,054,223 | 9/1962 | O'Brien | 52/392 |
| 3,177,279 | 4/1965 | Bilodeau | 264/255 |
| 3,306,956 | 2/1967 | Barnette | 264/1 |

Primary Examiner—Douglas J. Drummond
Assistant Examiner—Thomas E. Bokan
Attorney, Agent, or Firm—D. Laszlo Auer

[57] ABSTRACT

Rigid composite impact resistant textured tiles having a pliable and essentially void-free plastics facing component and a rigid backing component, are prepared by a specified sequential operation.

17 Claims, 25 Drawing Figures

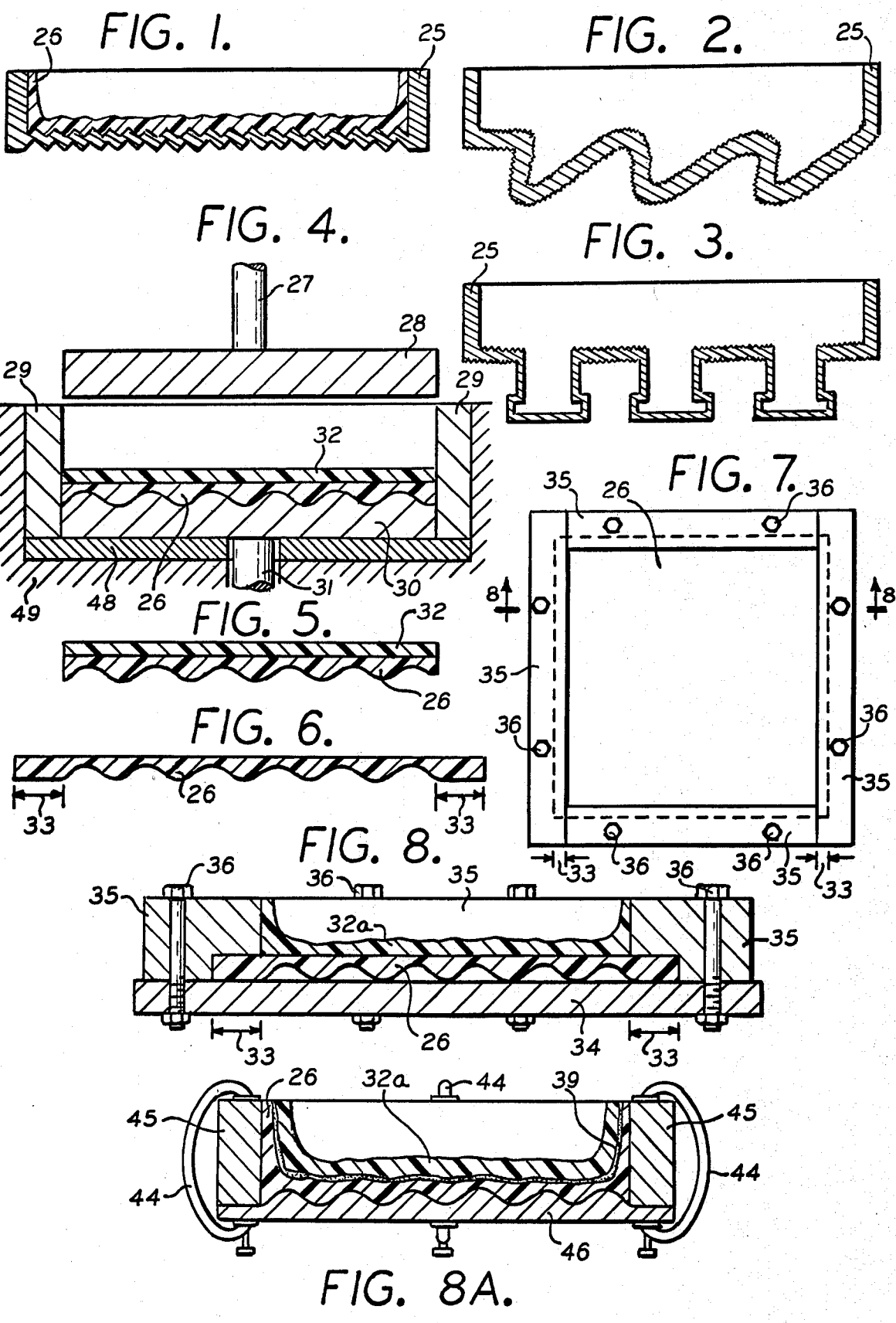

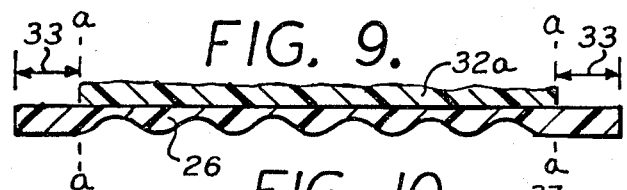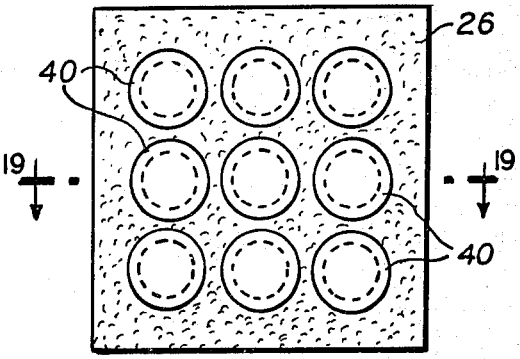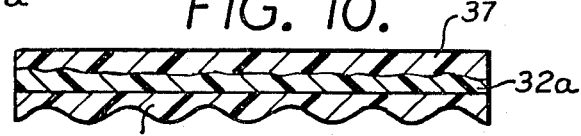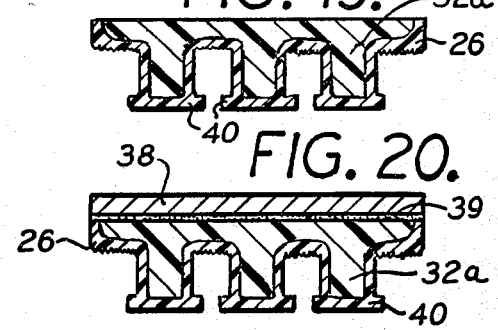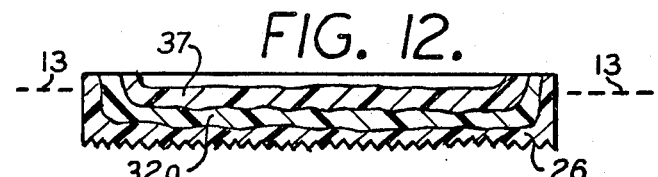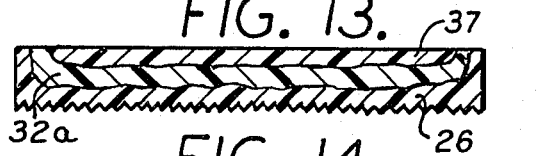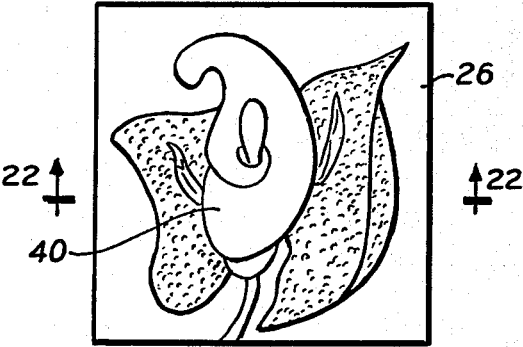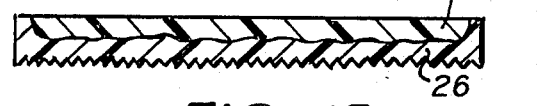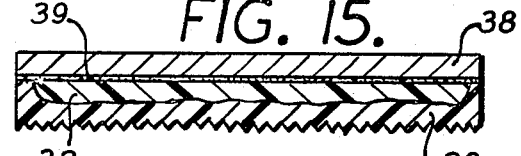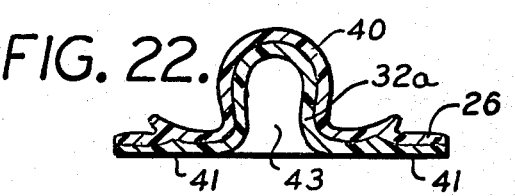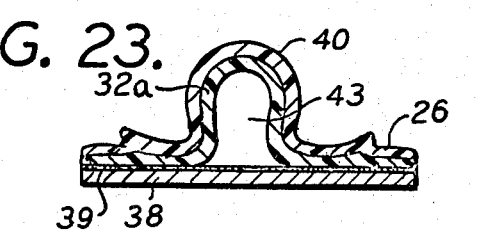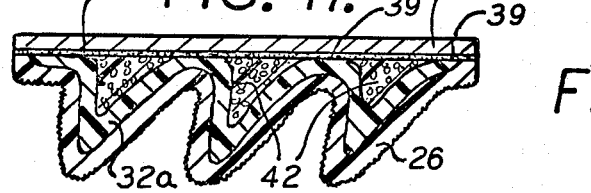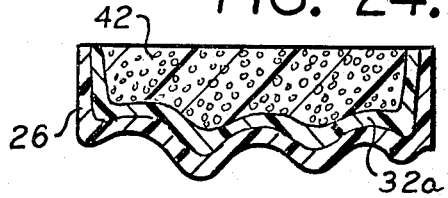

RIGID PLASTICS TILE WITH TEXTURED SURFACE

RELATED APPLICATIONS:

This application is a division of application Ser. No. 22,117, filed Mar. 30, 1971 (now abandoned), which is a continuation of application Ser. No. 526,605, filed Feb. 10, 1966 (now abandoned) which, in turn, is a continuation-in-part of applications Ser. Nos. 455,764 filed May 14, 1965 (now U.S. Pat. No. 3,405,026), 475,989 filed July 30, 1965 (now U.S. Pat. No. 3,414,456), 523,778 filed Jan. 28, 1966 (now U.S. Pat. No. 3,419,455) and 525,667 filed Feb. 7, 1966 (now U.S. Pat. No. 3,420,729), each of the last four-mentioned applications being a continuation in-part of application Ser. No. 22,002, filed Apr. 13, 1960 (now abandoned).

This invention relates to novel, rigid, impact resistant tiles and methods and means for their manufacture. In the prior art, tiles were made of ceramic or plastics materials. These prior art articles of manufacture have the disadvantage of either being fragile or sensitive to temperature changes.

An object of this invention is to provide tiles with improved properties and without the disadvantages of the prior art tiles. A further object is to provide a process for producing tiles of plastics with improved resistance to cold flow, chipping and breakage, and which is distinctly superior to prior art processes and the products produced thereby.

The articles of manufacture of my parent application are rigid, three-dimensional and hollow. They comprise two components: (1) an outer layer component, also called the "shell" and (2) an inner layer component, also called the "flesh" or "rigidifier." In most of the cases varying parallel cross sections of a single article show varying dimensions and shapes or configurations, indicating curved sidewalls and undercuts. In other cases the cross sections may be identical, indicating box-shaped or cylindrical objects. In an alternative form of said parent applications, the outer layer component and inner layer component jointly form a cavity and this cavity is then filled with a reinforcing spine, such as a rigid plastics foam material. The outer layer component is made of a flexible plastics material, illustrated by plastisol and polyethylene, whereas the inner layer component in the various parent applications is illustrated for instance by asphalt, plaster of paris and a composition comprising a filler which is bonded by the elastomer solids of a latex. In one of the parent applications the rigidifier component is a rigid cellular plastics, as illustrated by rigid polyurethane foams. In another one of the parent applications the rigidifier component is a resinous composition comprising rigid polyester resins or rigid epoxy resins.

The composite tiles of the instant invention are rigid and resistant to impact. The tiles comprise a facing component and a backing component. The facing component has a front surface and a rear surface. The front surface of the facing component is textured. For this invention the term "textured" includes raised and incised discontinuous patterns of decoration, such as embossed and carved designs, respectively. It also includes discontinuously curved surfaces. The facing component is made of a premolded pliable plastics and has preferably a wall thickness of from about 15½ to about 250 mils. The term "pliable" means that the facing component, when free of the backing component, is itself at least temporarily deformable by hand pressure. The backing component is a rigid structural member that is in supporting relationship to the facing component and rigidly maintains the latter in its preset and premolded shape. The backing component is in intimate contact with the entire rear surface of the facing component.

When discussing the measurements of the tile, it is useful to talk about its length, width and thickness. The tiles are preferably rectangular in their dimensions of length and width. The measurements of length and width are not critical. If the dimensions in length and width are comparatively larger, as for instance, when they are longer than a foot, the tile could well be called a panel. The measurements of length and width are more or less dictated by the manufacturing process or the intended end-use of the tile or panel. The thickness of the tiles and panels preferably range from about ⅛ of an inch to about 2 inches. These limits correspond to a thickness ranging from about 125 to about 2000 mils.

In many instances it is advantageous to place an adhesive layer between the facing and backing components in order to enhance their adhesion. It can also be of advantage to further support the backing component with an ancillary reinforcing element.

The materials suitable for the individual components of the composite tiles of this invention will be discussed under their respective headings further below.

The manufacturing procedures vary according to the selection of the facing component and of the backing component. They will also be discussed further below.

All percentages, parts and proportions in this specification are by weight.

In some cases the total thickness of the tiles of this invention can be made satisfactorily at 1/16th of an inch.

THE FACING COMPONENT

Plastisols illustrate an eminently suitable material to form the facing component. They are dispersions of finely divided polyvinyl resin powders in liquid organic plasticizers. The resins contain vinyl chloride in a polymerized state with or without other copolymerized monomers. They are polymerized to a degree where they have very low solubility at room temperature. Therefore, instead of dissolving them, the plastisols contain the resins in a dispersed state; the dispersions are usually of creamy consistency at room temperature and are always fluid to a certain degree. A great variety of plasticizers can be used, such as dioctyl phthalate or dioctyl adipate. The plastisols usually contain stabilizers and may contain pigment, if so desired. Formulations and application methods are described for instance, in the following publications: (a) Geon Resin 121 in Plastisol Compounding. Service Bulletin PR-4, Revised October 1958, B. F. Goodrich Chemical Company. 24 Pages. (b) The Vanderbilt News. Vol 26, No. 3, June 1960. R. T. Vanderbilt Company, Inc. Page 12. (c) Modern Plastics Encyclopedia Issue for 1961, published in September 1960. Vinyl polymers and copolymers. Pages 129 to 132. Plastisol Molding, pages 765 to 771. (d) Modern Plastics Encyclopedia 1965, (issued 1964). Vinyl Polymers and Copolymers, page 271. Plastisol Molding, page 690.

Recently a reactive vinyl plastisol system was introduced on the market. This consists of a mixture of a vinyl dispersion resin and a reactive monomer. The former is dispersed in the latter. When heat is applied to this system, also used to cause gelation and fusion, the reactive monomer polymerizes and produces a more rigid product than previously produced with conventional plastisols. Reactive acrylic monomers illustrate examples of such reactive monomers.

When molding plastisols, the material is heated to a gelling temperature and a gelled film or layer is formed which is very weak and cheesy, but which does not flow. Further heating is required to "fuse" the deposit, causing the resin to dissolve in the plasticizer and form a tough homogeneous resinous mass in which the powdered resin and liquid plasticizer have formed a single uniform phase. The fusion transforms the cheesy deposit or film to a tough leatherlike homogeneous shell.

With regard to temperatures required, these are well known in the art. They vary from composition to composition. They vary with time. There are, further, three types of temperatures involved: (1) oven temperature, (2) mold (die) temperature and (3) temperature of the plastisol. Gelation temperature may be accomplished by heating the oven from 150 to 600° F. and usually is between a plastisol temperature of 150 to 300° F. The necessary times vary with the temperature used. Fusion is accomplished by heating the gelled layer in ovens from about 350° F. to about 650° F. The achieved plastisol temperature for fusion should advantageously range from about 350° to 450° F. The gelation temperature and fusion temperature depend on the formulation of the plastisols. Therefore some divergence from the above temperature ranges may occur if special formulations are prepared.

The most useful molding methods for plastisol shells are illustrated by (a) slush molding, also called slush casting and (b) rotational molding, also called rotational casting. The expression "casting" is used because the plastisols are applied in fluid state and for this reason the operation has similarity to metallurgical casting.

Whereas the casting by slush molding or rotational molding is preferred to form the facing component from plastisols, other methods known in the art may also be followed to achieve the same purpose. In a suitable alternative the polyvinyl resins may be compounded on plastic mills, calendered to a sheeting and embossed, to yield suitable facing components.

Polyolefins, such as polyethylene and polypropylene are other illustrative examples for the production of the facing component of this invention. Polyethylene is made today of varying properties with the low pressure and high pressure polymerization processes. It is supplied with varying densities, molecular weights, flexibility and other characteristics. The types of polyethylene most suitable for this invention are pliable, flexible and show some degree of elasticity. Polyethylene is preferred in this invention over polypropylene since it is more easily formed into pliable and flexible facings. Polyethylene copolymers, such as ethylene-vinyl acetate and ethylene-ethyl acrylate copolymers, offer improved flexibility and resilience. They are rubberlike and similar to elastomeric plastics. Polyallomers belong to this class of materials, as they are copolymers of ethylene and propylene.

The facing component may be formed of other materials such as vulcanized natural and synthetic rubber. The facing components may be formed according to known procedures of rubber technology. Latex molding or casting, utilizing plaster or paris molds, is an illustration.

Other suitable plastics materials, which can form the facing component of this invention are illustrated by methyl methacrylate polymer, ethyl cellulose, polycarbonates, polyurethane elastomers, flexible epoxy compounds, flexible polyesters, amongst others. Some illustrative examples are given below:

EXAMPLE A.

METHYL METHACRYLATE

All percentages in this example and in this specification are weight percentages. A mixture was prepared of 62.5% methyl methacrylate monomer, 0.6% benzoyl peroxide, 2.1% white color paste concentrate, compatible with methyl methacrylate, 34.3% polymethylmethacrylate, DuPont's Lucite "30", 0.5% dimethyl-p-toluidine, totaling 100%. The facings were prepared by casting into suitable molds. The composition of this example polymerizes at room temperature. Heating to 100°–120° F. accelerates polymerization considerably. Latex molds can be used. Plaster and clay molds may also be used, if coated with gelatin, cellulose acetate, sodium silicate or tin foil. Casting was carried out in a latex mold in three subsequent coats and yielded a molded facing with acceptable flexibility and adequate mold surface reproduction. Plasticizers may be incorporated, if desired. Harflex 340 of Harchem Division, Wallace & Tiernan, Inc. is a suitable resinous-type, primary, non-migrating, saturated polyester plasticizer, compatible with methyl methacrylate monomer. The color paste was used to stain the facing. Its use is optional.

EXAMPLE B.

POLYCARBONATE

Polycarbonates can be cast from organic solvent solutions. Polycarbonates dissolve, with ease e.g. in methylene chloride. A solution was prepared from Lexan No. 105 (General Electric Co.) powder to form a solution of 83.3% polycarbonate in 16.7% methylene chloride, yielding 100% of the solution. As an example, this solution can be slush cast in latex molds, and air can be blown in to assist in volatilizing the solvent. The latex molds are standard in casting plaster of paris objects. The polycarbonate facing component remains in the mold. It is very strong, flexible and durable, and can easily be stripped from the mold. To reduce the effect of shrinkage, fillers may be incorporated. A ratio of equal weights of filler to polycarbonate is an illustrative example. The resulting facing component is still strong. Polycarbonate resins are marketed by General Electric under the trade name of Lexan. Polycarbonates can be described as polymeric combinations of bi-functional phenols or bisphenols, linked together through a carbonate linkage. They can also be blow molded and vacuum formed.

EXAMPLE C.

FLEXIBLE EPOXY RESIN

The proper composition has at least three ingredients. (1) a low molecular weight epoxy resin of the epichlorhydrin-bisphenol A—condensation product type, like Shell Chemical's Epon 828. (Epon is a registered trademark of Shell); (2) low viscosity liquid aliphatic polyepoxides, like Epon Resin 871, which imparts increased flexibility to Epon resin compositions; and (3) a curing agent, illustrated by diethylenetriamine and triethylenetetramine, respectively known as DTA and TETA. Other comparative items, known in the trade, may be replaced for the commercial products mentioned. Fillers may be present as additional ingredients. A suitable additive to regulate viscosity is a submicroscopic pyrogenic silica prepared in a hot gaseous environment, marketed by Cabot Corporation under the tradename of Cab-O-Sil. A satisfactory composition to obtain facings if 44.25% Epon Resin 828, 44.25% Epon Resin 871, 2.65% of Cab-O-Sil and 8.85% diethylenetriamine, totaling 100%. This composition sets at room temperature in about 5 hours and at 80° C. it sets in 2 hours. The composition may be varied according to principles known in the art. Facings can be molded in latex molds or other elastomer molds. These are actually multipieced plaster of paris molds externally reinforcing an entirely separate second flexible elastomer mold, having one opening for pouring in the composition to be molded and set. The rubber surface is coated with a parting agent and the epoxy composition is slush cast into the molds. The slit mold here described is used to mold facings showing undercuts. Other molds and molding methods can also be used, depending on the article to be manufactured. Epoxy plasticizers include epoxy compounds of fatty oils and their acids. Epoxy novolac resins and cycloaliphatic epoxies are other illustrative members of this group. Polyamids and acid anhydrides may also be used as curing agents.

EXAMPLE D.

FLEXIBLE POLYESTERS

Polyester resins are usually made in two steps. In the first step a condensation reaction is carried out between a dibasic acid and a diol and this is then blended with a monomer. Maleic anhydride and fumaric acid are examples of the dibasic acids. Other unsaturated acids could also be used, like itaconic. Phthalic anhydride and isophthalic acid may be part components of the acids, to secure desired modifications. The useful glycols form a long list known in the art. Propylene glycol, ethylene glycol, diethylene glycol and dipropylene glycol are illustrative examples. Neopentyl glycol is another example. Styrene is most frequently used as the crosslinking monomer. Vinyl toluene is another example. LAMINAC Polyester Resin EPX-126-3 is a flexible polyester resin containing styrene monomer. LAMINAC is a registered trademark of American Cyanamid. A composition was prepared from LAMINAC Polyester Resin EPX-126-3 92.6%, MEK peroxide 2.7%, Cobalt Naphthenate solution (6% Co) 0.27%, LAMINAC Additive No. 10, 1.73% and Cab-O-Sil 2.7%, totaling 100%. MEK peroxide is methylethyl ketone peroxide. LAMINAC Additive No. 10 is a petroleum wax composition dispersed in styrene, for ease of incorporation into polyesters. It improves surface characteristics. The peroxide is the crosslinking agent and the cobalt assists the crosslinking. Flexible polyesters usually contain long chain acids or glycols. The gel time at room temperature is about 10 minutes for this composition. The Cab-O-Sil assists in regulating the thickness of the deposit if slush casting is used for molding. Two or three coats can be slushed to obtain a desired facing thickness. The facing formation occurs at room temperature. More rigid polyesters can be blended with the flexible one used in this example, to vary properties. Latex molds and those utilized for epoxy resins, may be used with polyesters.

EXAMPLE E.

ISOCYANATE ELASTOMERS (URETHANE ELASTOMERS)

Liquid urethane polymers, such as DuPont's ADIPRENE L-100, can be transformed into tough, rubbery solids by reaction of the isocyanate group with polyamine or polyol compounds. In addition, some materials which do not contain active hydrogens, such as the titanate esters, appear to catalyze cross-linking. ADIPRENE L-100 can be cured with diamines, or moisture (water), or polyols, or by catalysts, such as lead or cobalt naphthanate, potassium acetate and titanate esters. Tetrabutyltitanate is an example of the esters. One of the popular polyamines is MOCA, which is 4,4'-Methyelene-bis-(2-chloroaniline). A formulation is illustrated by 100 parts of ADIPRENE L-100 and 12.5 parts of MOCA, which gives a MOCA %-equivalent of 95. Parts are by weight. Conditions were: Mixing temperature: 212° F., cure temperature: 212° F., curing time: 3 hours. LD-420 is a different type of liquid urethane elastomer, which yields high quality vulcanizates when cured with MOCA. A respective formulation is illustrated by 100 weight parts of LD-420 (DuPont) and 8.8 weight parts of MOCA. This is mixed and cured the same way as ADIPRENE L-100, for the same length of time. It is improved by aftercuring 1 week at 75° F. at 60% relative humidity. In making a facing rotational molding is recommended both for ADIPRENE L-100 and for LD-420. A silicone mold release is advantageously used to assist separation from the molds.

EXAMPLE F.

ETHYL CELLULOSE

Ethylcellulose facing components can be molded by various methods suitable for this plastics. Injection molding and stamping preformed sheets are illustrative. The same applies to cellulose acetate and cellulose acetobutyrate. Where proper hot melt compositions can be formulated, a combination of casting and hot melt methods may also be used.

The preset molded facing components can be prepared by various molding processes suitable for the respective selected plastics and known in the art. For illustrative purposes a few examples are given. Casting, such as slush casting or rotational casting: Plastisol, flexible polyester, flexible epoxy resins, methyl methacrylate, polycarbonates from solution, rubber from latex, etc. Injection molding: Plastisol, polycarbonates, ethylcellulose, polyethylene, cellulose acetate, cellulose acetobutyrate, etc. Hot melt process: Ethylcellulose, plastisol or other plasticized polyvinyl chloride composition, polyethylene, etc. Vacuum forming: Polyethylene, polycarbonates, polyallomers, etc.

Depending on the plastics material selected and the design of the object, one-piece or multi-piece molds are used. The molding process also influences the mold selection. Plastisol illustrates a facing component forming material which permits the use of one-piece molds even if the texture design has many undercuts in its shape.

The expression that the facing component materials are flexible, pliable, and resilient is meant in a relative manner in comparison with the backing component of the composite manufactured tiles which are relatively rigid. The composite tile itself is rigid. It resists indentation, chipping, etc. The backing component rigidifies the flexible facing component and improves resistance to cold flow and heat distortion. The facing component protects the rigidifier backing component from fracture and improves its resistance to impact. This mutual improving effect between the facing and backing components is unexpected and surprising, and the effect obtained could be described as synergistic. In many cases the tensile strength of the composite tile shows improvement when compared separately with that of the facing or backing component. These observations apply to facing components made of plastisols, flexible polyesters, flexible epoxy resins, polyethylene, polypropylene, polyallomers, polyurethane elastomers, rubber, polycarbonate, ethylcellulose, methyl methacrylate, amongst others. The degree of the above discussed improvements may vary according to the selection of the facing component forming material, its secondary compounding ingredients, thickness and shape of the facing component, selection and formulation of the material used for the backing component and its thickness, amongst other factors.

According to a more recent type of molding method facing components can be molded by rotational casting of powders. Polyethylene in powder form illustrates suitability for this method. The powder is rotated to obtain uniform distribution over the interior surface of the mold. The mold is then heated to obtain the required molding temperature.

For the purposes of forming the facing component the thermoplastic plastics materials are preferred. These are illustrated by plastisols and polyethylene. The reactive vinyl plastisol systems containing reactive acrylic monomers, discussed further above, are considered as thermoplastic for the purposes of this invention and are included in the preferred group of plastics for forming the facing component of the tiles.

Latex molding of the facing component, as discussed above, is described in my prior application Ser. No. 475,989 (now U.S. Pat. 3,414,456) and related data are in The Vanderbilt News, Vol. 27, No. 4, Dec. 1961. This is a publication of the R. T. Vanderbilt Co. and deals with latex compounding and molding.

THE BACKING COMPONENT

The backing component of the composite tiles is applied in a fluid state and is formed by a solidification process carried out during the manufacturing process. The solidification may be caused by various factors. Plaster of paris solidifies by adjustment of combined crystal water. Asphalt is applied hot and solidifies by cooling. Latex compositions solidify by evaporation of water and in many cases additionally by vulcanization. Polyurethane foams, rigid polyester resins and rigid epoxy resins solidify by polymerization and/or condensation reactions. After the respective solidification process is completed the backing component becomes rigid and is suitable for its role to rigidify the pliable facing component of the composite tiles.

Plaster of paris is a calcium sulfate hemihydrate. It contains 1 mol of water per 2 mols of calcium sulfate in its structure. By the addition of water, plaster of paris is converted to a fluid composition and in time solidifies to a solid product. Its setting time can be accelerated by adding suitable accelerators known in the art and it can also be retarded by adding plaster retarders, such as glue, dextrin, etc. My prior applications Ser. No. 22,002 (now abandoned) and 455,764 (now U.S. Pat. 3,405,026) discuss further details of the application of plaster of paris as a rigidifier.

Asphalts vary in their properties depending on the source and location of their derivation. They contain a large number of diversified chemical compounds in admixture, most of them being hydrocarbons by nature. Melting points, hardness, resistance to fracture, softening points, aging properties may vary to a great extent, amongst other properties. Based on available properties and the desired end-use it is not a difficult task to select the proper asphalt composition. Asphalt is applied preferably from a molten and liquid state. It solidifies by cooling. My prior applications Ser. Nos. 22,002 (now abandoned) and 455,764 (now U.S. Pat. 3,405,026) contain data on the use of asphalts as rigidifiers for specific purposes.

One of the favored backing components for the purposes of this invention are rigid compositions comprising a filler bonded by the elastomer solids of a latex. Illustrative for suitable elastomer solids are latex solids of natural rubber, or a copolymer comprising an acrylic ester and an acrylic acid, of a nitrile rubber, amongst others. Latex solids comprising vinyl chloride and an acrylic acid, or vinyl chloride and an acrylic ester in a polymerized state, are other examples. My prior application Ser. No. 475,989 (now U.S. Pat. 3,414,456) has more detailed data on the various latices suitable to prepare rigidifiers. An illustrative list of latices useful in the preparation of backing components are: (1) Natural rubber latex, like centrifuged natural Hevea latex; (2) Gutta Percna latex; (3) Balata latex; (4) Styrene-butadiene copolymer latices of varying monomer ratios; (5) Polyisoprene latex; (6) Neoprene latex; (7) Butadiene-acrylonitrile latices of varying monomer ratios; (8) Butyl rubber latex; (9) Polyvinyl chloride latices, plasticized, either internally or by plasticizer emulsion addition; (10) Polyvinyledene chloride latex; (11) Vinyl chloride-acrylic copolymer latices; (12) Ethylene-propylene copolymer latex, emulsified as a cement, after polymerization is completed; (13) Acrylic copolymer latices made of various monomer mixtures, amongst others.

Examples of commercial latex products available and the names under which they are marketed, are as follows:

Centrifuged natural rubber latex: UNITEX (Stein Hall). Polyisoprene latex: Shell Isoprene Latex 700 (Shell Chemical Company). Styrene-Butadiene latex: Pliolite 5352 (Goodyear) with a 30:70 styrene to butadiene ratio and Polyco 2422 (Borden Chemical Co.) with a 90:10 styrene to butadiene ratio. Neoprene (Polychloroprene) Latices: Neoprene Latex 571 and Neoprene Latex 400 (duPont). Butadiene-Acrylonitrile Latices: (a) Non-reactive copolymers: Hycar 1551 and 1561 (high acrylonitrile), Hycar 1562 (medium acrylonitrile) (Hycar is a registered trademark of B. F. Goodrich Chemical Company). (b) Reactive terpolymers containing in addition to butadiene and acrylonitrile a small quantity of an acrylic acid in a copolymerized state; Hycar 1571 (high acrylonitrile) and Hycar 1572 (medium acrylonitrile). Polyvinyl chloride Latices: Geon 151. (Geon is a registered trademark of B.F. Goodrich Chemical Company). Polyvinyl chloride (P.V.C.) is not suitable as a binder as such and its latices have to be internally plasticized or mixed with a plasticizer emulsion or plasticizing elastomer latex. Latex plasticized polyvinyl chloride latex is illustrated by Geon 552 latex, which is an intermixture of a PVC latex and a latex of a butadieneacrylonitrile copolymer. Geon 576 illustrates an internally plasticized PVC latex, produced by copolymerizing vinyl chloride with methyl acrylate. A plasticizer plasticized PVC latex is illustrated by a latex containing in its solid content 100 parts of a copolymer of 80 parts of vinyl chloride and 20 parts of methyl acrylate and, in addition to said 100 parts, 35 parts of dioctyl phthalate in an emulsified state. Polyvinylidene chloride latices are rarely made as homopolymers. Examples of internally plasticized terpolymers are: (1) copolymer of 46 parts of vinyl chloride, 27 parts of vinylidene chloride and 27 parts of methacrylic acid. (2) Copolymer of 46 parts of vinyl chloride, 27 parts of vinylidene chloride and 27 parts of methylhexyl acrylate. A product, which is an internally plasticized polyvinyl chloride and polyvinyledene chloride copolymer is Geon 450 × 167. Various other latices containing polyvinyl chloride or polyvinylidene chloride are Geon 351, Geon 652, Dow Latex 700 (Dow Chemical), Pliolite 300 (Goodyear). Polyvinyl acetate homopolymer is illustrated by Polyco 117-H (Borden Chemical Company).

The expression "acrylic polymer" is considered for the purposes of this invention as a generic term which includes acrylic copolymers, i.e. polymers made of more than one acrylic monomer. An acrylic monomer is an acrylic type acid, its derivatives and substitution products of the acid and its derivatives. The term "derivative" includes esters and nitriles.

The term "an acrylic type acid" is a polymerizable alpha-beta unsaturated monovinylidene carboxylic acid, such as acrylic acid, methacrylic acid, ethacrylic acid, alpha-chloroacrylic acid, cinnamic acid, atropic acid, crotonic acid. Preferred are acrylic and methacrylic acids. Halogen substituted acrylic acids are also advantageous.

The elastomers of this invention comprising an acrylic polymer are insoluble in water.

Examples of nitrile derivatives are: acrylonitrile and methacrylonitrile.

Examples of ester-forming alcohols are the following: Alkyl alcohols, such as methyl, ethyl, n-propyl, iso-propyl, 2-methyl pentanol, 3,5,5,-trimethylhexyl, tertiary butyl, octadecenyl alcohol. Substituted alkyl alcohols, such as chloroethyl, chlorobutyl, 2-methoxyethyl, 2-butoxyethyl, 2-nitro-2-methyl propyl, oxoalcohol of an isobutylene cimer, alkoxyethyl; Alicyclic alcohols, such as cyclohexanol and methylcyclohexanol; Aromatic alcohols, like phenols and araliphatic aochols, like benzyl alcohol; Heterocyclic alcohols, like furfuryl and tetrahydrofurfuryl alcohol. Preferred alcohols have 1 to 18 C atoms in their aliphatic chain and the most commonly used ones have no more than 8 C atoms.

Acrylic acid homopolymers do not belong to this class, as they are water soluble. Acrylic esters as homopolymers, or copolymerized alone, cannot be crosslinked with ease. Acrylic nitriles as homopolymers yield products that are too tough. Binary copolymers of acrylic acids with acrylic nitriles and binary copolymers of acrylic acids with acrylic esters can be crosslinked. One of the good copolymers is at least ternary and contains acrylic esters, nitriles and acids copolymerized. The acrylic acids in copolymers run between 2 and 15% of the total copolymer. Nitriles do not exceed, if used, 40% of the total, and 15 to 30% represents a satisfactory range. Acrylic ester content of the copolymers may go as high as 95 to 98%, if nitriles are absent. Where nitriles are present, the ester content may range from 40 to 80%. Elastomer content can be varied by intermixing the respective individual latices.

Prepolymerized elastomers may be emulsified in the presence or absence or organic water-immiscible solvents, to form latex-type binders. Royalene P-3520 is an emulsified cement, made by U.S Rubber, from prepolymerized ethylene-propylene copolymer. Neoprene cements can also be emulsified.

So Called carboxy-modified copolymers can be crosslinked many times by the action of heat alone or by the addition of vulcanizing agents with or without application of heat. Hycar 1570 × 20 is a carboxy-modified butadiene/acrylonitrile latex suitable for coagulant dipping. It has high tensile strength, outstanding abrasion resistance and good oil and solvent resistance. Its acrylonitrile content is characterized as medium-high. Its stress-strain properties can be varied from those characteristic of a rubber elastomer to those typical of a polyurethane elastomer. It can be vulcanized by certain metal oxides or salts alone. Zinc oxide or sodium aluminate may be used as sole vulcanizing agent. A standard sulfur/zinc oxide/accelerator system may be used for vulcanization also. Zinc oxide levels and pH changes can vary its properties, greatly. Calcium nitrate in methanol solution is a recommended coagulant.

A carboxy-modified butadiene-styrene polymer is illustrated by Good-rite 2570 × 5. (Good-rite is a registered trademark of B.F. Goodrich Chemical Co.) It has the ability to cure by the application of heat alone. Heat crosslinking can be catalyzed by the addition of oxalic acid or ammonium chloride, permitting lower curing temperatures. Of course regular cures with conventional curing systems are also useful. A third curing system is zinc oxide or sodium aluminate. These act upon the carboxylic portion of the polymer. Sodium aluminate cures in 3 days at room temperature. Zinc oxide performs similarly in the presence or absence of sulfur.

A useful class of reactive acrylic copolymers is illustrated by Hycar 2671, Hycar 2600 × 92 and Hycar 2600 × 113. Hycar 2671 is anionic and yields, upon air-drying at room temperature, properties which are valuable for many applications. For curing, it requires temperatures of from about 300° to about 325° F. Acid salts, like diammonium acid phosphate and ammonium chloride, lower the curing temperature. Crosslinking agents can be utilized, like glyoxal, butylene glycol, triazine resins, melamine-acrylic resins, etc. It has good resistance to discoloration. Hycar 2600 × 92 is a modification of Hycar 2671 with improved resistance to discoloration by light and heat, otherwise having similar hardness or softness properties. It has greater modulus and less elongation than 2671 after 3 days room-temperature drying. Oxalic acid catalyizes its cures and lowers curing temperature. Zinc oxide is a favorable additive. Hycar 2600 × 113 is heat reactive and much softer than 2671 or 2600 × 92. A cure cycle of 3–7 minutes at 300° F. is suitable. Oxalic acid or ammonium chloride catalyze the crosslinking and lower the required temperature. It shows remarkable stability to multivalent ion salts, alcohols, solvents, etc. It can be cured at 212° F. in 3 minutes to acceptable strength. Hycar 2600 × 112 is a similar copolymer with film forming heat reactivity at as low as 150° F. It has increased hardness compared to 2671 and 2600 × 92. Hycar 2600 × 112 does not form films at room temperature and requires elevated temperatures for performance.

It will be realized that physical strength of the backing component will depend on the particular latex binder applied, presence or absence of crosslinking or curing and the filler combination used.

It is possible to vulcanize natural rubber particles in dispersed state, i.e. in latex form. Upon drying, such latex immediately forms strong vulcanized films. Such a latex was marketed under the trade name of Vultex with about 30–33% N.V. and in concentrated form under the trade name of Revultex with about 60–65% N.V. Such vulcanized or crosslinked elastomer latices are also useful in this invention.

The fillers used in the backing component with latices may be varied. Pigments, like titanium dioxide, lithopone, zinc sulfide, zinc oxide and others used in emulsion paint formulations may be used. Extender pigments and coarse fillers may also be used. Various types of clays or Kaolins, calcium carbonate (natural or precipitated), such as whiting, and coarser materials, like flint ($SiO_2$) can be utilized. A 60 mesh silica illustrates the coarser materials. Talc and magnesium silicate, barium sulfate, colored pigments, like iron oxides, ochres, etc. may be used. Addition of small quantities of fibrous materials to the fillers may help to strengthen the backing layer portion of this invention. Asbestos fibers, short staple fiberglass may be mentioned as examples. The illustrative example here below uses a combination of whiting, McNamee Clay and flint (silica) in a satisfactory proportion.

Other examples of fillers are: sheel flour, carbon black, diatomaceous earth, aliminum hydroxide, hydrated alumina, bauxite powder, magnesium carbonate, dolomite powder (calcium-magnesium carbonate), mica, etc. For the coarse particle size component vitreous rock of igneous origin may be used. Portland cement forms with latices interesting compositions, while it binds part of its water content. With proper care portland cement may be incorporated as part of the fillers.

Coarse fillers have greatly reduced surface area, compared with fine particle size fillers, Therefore, a coarse filler can be loaded into a latex mix in comparatively high proportion, without requiring additional binder content. The coarse fillers help to reduce the danger of cracking during drying and assist in decreasing shrinkage to a considerable extent.

When using clays as part of the filler, the soft clays, like McNamee clay, are more advantageous, than the hard clays, like Dixie clay.

The latex solids may have a varying relationship to the fillers. A practical relationship is illustrated by a range from about 200 weight parts to about 2000 weight parts of filler for each 100 weight parts of the elastomer binder. The latex solids are considered as the elastomer binder of a particular latex. In my copending application Ser. No. 475,989 (now U.S. Pat. No. 3,414,456) numerous illustrative examples are listed showing a range of from about 300 weight parts to about 1000 weight parts of filler per 100 weight parts of elastomer. Generally speaking, the water containing mixes forming the backing component of this type are highly loaded latex compositions, that is, they have comparatively high filler content. The coarse particle size fillers in the filler portion of the highly loaded latex type backing component range from about 40% to about 70% by weight of the said filler portion. It is preferred that the coarse particle size fillers exceed 50% of the total weight of the fillers used. The coarse particle size fillers pass through a 60 mesh screen and the fine particle size fillers pass through a 200 mesh screen. A suitable filler portion of elastomer containing backing components is illustrated by about 10 to 11% of clay, about 30 to 33% of whiting and about 56 to 60% of 60 mesh silica.

A composition of matter suitable to form the elastomer bonded filler type backing component comprises a filler component, an elastomer solids component and water. The water ranges from about 10% to about 20% by weight of the wet composition. The filler component is present in proportions ranging from about 300 weight parts to about 1500 weight parts for each 100 weight parts of elastomer solids and the coarse fillers are present in quantities ranging from about 40% to about 70% of the total weight of the fillers. 60 mesh silica illustrates a suitable coarse filler and it is advantageous if its proportion in the total weight of the filler portion is at least 50%.

Example 1 illustrates a useful latex composition.

EXAMPLE 1.

Hevea Latex Composition for Backing Component.

|  | Wet Weight % | Dry Content in wet weight, %/Weight | Dry Weight % |
|---|---|---|---|
| PART A | | | |
| Water | 8.64 | — | — |
| 10% Aqueous KOH solution | 0.53 | 0.05 | 0.06 |
| 60% Aqueous zinc oxide dispersion | 0.26 | 0.16 | 0.19 |
| 25% Aqueous Darvan 7 solution | 0.77 | 0.19 | 0.22 |
| 68% Aqueous sulfur dispersion | 0.11 | 0.07 | 0.08 |
| McNamee Clay (Kaolin) | 8.32 | 8.32 | 9.75 |
| Yorkshire Whiting | 24.87 | 24.37 | 29.14 |
| Subtotal for Part A | 43.50 | 33.66 | 39.44 |
| PART B | | | |
| Natural centrifuged latex, 62.5% N.V. | 11.75 | 7.34 | 8.60 |
| 10% Aqueous KOH solution | 0.36 | 0.04 | 0.05 |
| 25% Aqueous Darvan 7 solution | 0.07 | 0.02 | 0.02 |
| 65% Aqueous dispersion of Agerite Spar | 0.11 | 0.07 | 0.08 |
| Setsit 51 accelerator 100% | 0.11 | 0.11 | 0.13 |

-continued

|  | Wet Weight % | Dry Content in wet weight, %/Weight | Dry Weight % |
|---|---|---|---|
| PART A |  |  |  |
| Subtotal for part B | 12.40 | 7.58 | 8.88 |
| PART C |  |  |  |
| Mix Parts A + B = Subtotal | 55.90 | 41.24 | 48.32 |
| PART D |  |  |  |
| Silica 60 mesh | 44.10 | 44.10 | 51.68 |
| Total | 100.00 | 85.34 | 100.00 |

Parts A and B are first prepared separately and then they are mixed. Part D is added last.

In another embodiment of this invention the backing component is a rigid cellular plastics. This may have open or closed cell structures. They are illustrated by rigid foams of polyurethanes, polystyrene, silicones, epoxy resins, polyvinyl chloride, phenolic resins, cellulose acetate, acrylic compositions, polyesters, urea resins, asphalts, amongst others. Syntactic foams represent a special group. Rigid plastics foams are well known in the art and are discussed by T. H. Ferrigno in "Rigid Plastics Foams," Reinhold Publishing Corp., 1963. The rigid plastics foams are not equally suitable for the instant invention. Thermosetting plastics foams are preferred. The most preferred rigid plastics foam formers are the rigid polyurethane foam compositions. The next preferred foam formers are the rigid epoxy resin compositions. Low curing temperatures and fast foam setting rates are an advantage. The setting rate should not be so fast as to prevent adequate distribution of the foaming composition over the entire rear surface of the facing component. My prior patent application Ser. No. 523,778, filed Jan. 28, 1966, (now U.S. Pat. No. 3,419,455) discusses rigid foam compositions and their chemistry in detail.

Rigid polyurethane foam layers can be prepared according to this invention by any one of the three major methods: (1) prepolymer method, (2) quasi-prepolymer method and (3) the one-shot method. The quasi-prepolymer method is preferred. The application by poured-in-place or foamed-in-place method is satisfactory. In the quasiprepolymer method the diisocyanates are prereacted with a portion of the chemically equivalent quantity of polyols or polyetheralcohols leaving a desired excess reactive —NCO groups free and available for a second stage reaction.

Quasi-prepolymer two-package systems are marketed by various suppliers with varying qualities. As illustration Nopcofoam H-102N and Nopcofoam H-103N systems are mentioned, supplied by Nopco Chemical Company. The components are marketed as T-component and R-component. The T-component is the quasi-prepolymer formed by the diisocyanate and a polyether polyol. It has reactive —NCO groups. It supplies the isocyanate radicals for the foaming reaction. The T-component may also contain surface active agents, such as silicones. The R-component contains the polyether polyols supplying additional OH-grouping for the foaming and polyurethane forming reaction. In this H-Series the R-component contains the fluorocarbon blowing agent, the catalyst, such as N-ethyl morpholine and dibutyltin dilaurate and may also contain all or part of the surface active agents, such as the silicones. The suitable fluorocarbon is illustrated by Freon No. 11, which is trichlorofluoromethane, having a boiling point of about 74.7° F. The H-series of Nopcofoam compounds have a fast curing cycle. With formulation changes the curing speed and the pcf (pounds per cubic feet) of the resulting foam may be varied. The same applies to the start of the rise and rise time of the foaming. Nopcofoam H-102N supplies a rigid foam close to 2 pcf.

The foaming instructions are as follows for Nopcofoam H-102N: The temperature of both components should not be higher than about 70°–75° F. The mixing ratio is about 52% R and 48% T, by weight. The R-component is poured into the T-component in the proper weight ratio. This is followed by mixing with a high speed drill motor, having a minimum RPM of 1800, using proper mixing blades, such as an impeller type. Mixture becomes creamy white and volume increase is noticed in about 25 to 30 seconds. The mold containing the facing component, or the facing component acting as a mold, may advantageously be preheated to 100° to 130° F. This is advantageous particularly where the foam has to fill areas of small cross-section. The higher the temperature the more rapid the foaming action. The foam cures at room temperature in about 24 hours.

The foaming instructions for Nopcofoam H-103N are similar to those of H-102N with regard to temperature, mixing, mixing time, and curing. However, the mixing proportions of the components are about 50% R-component and about 50% T-component, by weight. The average core density is 2.6 pcf; the "K" Factor, Aged (BTU/hr/sq.ft/°F./in.thick) is 0.120; maximum recommended service temperature is 180°F.

Carbon dioxide blown rigid foams can also be prepared from prepolymers or quasi-prepolymers.

One of the advantages of rigid polyurethane foams and rigid epoxy resin foams for the purposes of this invention is that they can be cured at room temperature or at comparatively low elevated temperatures.

According to still another embodiment of this invention the backing component comprises rigid resinous compositions. These are either rigid polyester resin compositions or rigid epoxy resin compositions. Both of these types can be cured to a thermoset stage at low temperatures, such as at room temperature.

Copending application Ser. No. 525,667 (now U.S. Pat. No. 3,420,729), contains detailed discussion of rigid polyester resins and rigid epoxy resins. Polyester resins are made in two steps. In the first step a condensation and esterification reaction occurs between a dibasic acid and a diol. In the second step the condensation product is blended with a reactive monomer, such as a vinyl monomer. The dibasic acids can be saturated and unsaturated. The "saturated" ones are illustrated by phthalic anhydride and isophthalic acid. These aromatic dibasic acids behave like saturated acids and this is why they are so considered in the chemistry of polyesters. Maleic anhydride, fumaric acid and itaconic acid are examples of the unsaturated dibasic acids. Propylene glycol, ethylene glycol, diethylene glycol, dipropylene glycol, amongst others, are examples of suitable diols. Styrene and vinyl toluene are examples of the crosslinking vinyl monomer. The monomer content ranges from about 25 to about 50%. It is customary in the trade to consider the modulus of elasticity in flexure, expressed in psi, as an indicator whether a polyester is rigid or flexible. The respective values are: Semi-rigid to rigid polyesters 3 to 6 × $10^5$ psi, semi-flexible polyesters 1 to 3 × $10^5$ psi and flexible polyesters less than 1 × $10^5$ psi. For flexible polyesters many times the flexural strength and flexural modulus are lower than what could be measured on conventional testing machines. Elongation at break in percents ranges between 1 and 2 for rigid polyesters and may range as high as 75 to 200 for flexible polyesters. Examples 2 and 3 illustrate compositions suitable to form rigid polyesters for the backing component of the tiles. The latter one is suitable for fiberglass reinforcement.

EXAMPLE 2:

Rigid polyester for backing component.

A rigid polyester slush casting composition is prepared by mixing 41.34% of LAMINAC Polyester Resin 4128, 0.10% cobalt naphthenate (6% Co), 41.34% of 325 mesh silica (flint), 16.53% of 60 mesh silica (flint), and 0.69% MEK peroxide, totaling 100%. The ingredients are mixed in the order of listing. The setting time of this filled polyester composition can be varied by changing the proportions of the catalyst (MEK peroxide) and cobalt metal content. The polyester resin used in this example gels at room temperature in absence of fillers in time intervals ranging from about 10 minutes with 1% catalyst and 0.3% cobalt naphthenate (6% metal content), to about 180 minutes with 0.5% catalyst and absence of cobalt naphthenate. In these gelling tests the MEK peroxide is applied as catalyst in a 60% solution. The setting time of the filled composition of this example may be varied from about 4 minutes to about several hours at room temperature.

EXAMPLE 3:

Rigid polyester composition for backing component, suitable with fiberglass reinforcement.

A composition suitable for use with fiberglass reinforcement has the following weight parts: LAMINAC Polyester Resin 4128 100 parts, cobalt naphthenate (6% metal content) 0.2 parts, 325 mesh silica 100 parts and MEK peroxide 1 part, totaling 201.2 parts. This composition sets in about one half hour. By varying the quantities and proportions of the catalyst and accelerator the speed of setting can be changed and regulated. Increased ambient temperature accelerates setting time.

Epoxy resins are characterized by the presence of epoxy groupings. They are well known in the art. Reference is made to Modern Plastics Encyclopedia 1966, referred to above, pages 165 to 169. One of the commercially available types is made by condensation of bisphenol A with epichlorhydrin. Generally 2 mols of epichlorhydrin are reacted with 1 mol of bisphenol A. Polymerization may occur during the condensation reaction in varying degree. All of these resins have epoxide groupings in the two end positions in a linearly written formula. The polymerized center positions show ether linkages and hydroxyl groupings, both formed by the epoxy grouping of the epichlorhydrin. If we consider the number of the linkages converted to ether-hydroxyl groupings as $n$, one can visualize that $n$ can be equal to zero or more. The resins containing $n=0-1$ are liquid and are preferred for the purposes of this invention. The types where n is higher than 1 become gradually more solid and brittle and are more suitable for esterification reactions, for instance, with fatty acids for coating material purposes. A few EPON resins are listed here for illustrative purposes. EPON is a registered trademark of Shell Chemical Company. EPON Resin 828 is designed in theory to give $n=0$, but in practice its $n$ content is between 0 and 1. Its epoxide equivalent is 185 to 192. EPON Resin 830 is similar to EPON Resin 828, but its $n$ is slightly nearer to 1 than with the 828 type. This indicates the presence of some higher homologues. Its epoxide equivalent is 190 to 210. EPON Resin 834 is formulated in theory to have $n=1$, but in practice its $n$ is between 1 and 2. This is also indicated by the epoxide equivalent of 230 to 280 for this resin. All 3 of these resins are liquid at room temperature.

Another type of epoxy resins is the group of low-viscosity, liquid, aliphatic polyepoxides. They are prepared by the oxidation of olefins with peracetic acid. Other examples of epoxy resins are cycloaliphatic epoxy resins and epoxidized fatty oils and fatty acid esters. EPON Resin 871 is an illustration of liquid aliphatic polyepoxides with an epoxide equivalent of 390 to 470. It is compatible with EPON Resin 828 in all proportions and is suitable to increase the flexibility of the latter. The list herein given is illustrative and does not limit the scope of suitable epoxy resins.

The selection of a curing agent or hardener for epoxy resins depends on the application. Factors considered in selection of the hardener include: (1) viscosity; (2) pot life; (3) curing cycle; (4) end-use property requirements; and (5) environmental conditions expected in the end-use. The curing agents fall into the broad categories of (a) amines, (b) acids and anhydrides and (c) catalysts and latent hardeners. Suitable curing agents include DTA (diethylenetriamine, also called DETA), AEP (N-aminoethylpiperazine), TETA (triethylenetetramine), NMA (NADIC Methyl Anhydride), AA (adipic anhydride), DDSA (dodecenylsuccinic anhydride). Catalysts include borontrifluoride-monoethylamine, dicyandiamide and benzyldimethylamine.

Flexibility and rigidity is regulated, for example, by the percentual proportion of the bisphenol-A comprising rigid epoxy resins and of the flexible liquid aliphatic polyepoxide. Epoxidized fatty acid esters may also be used as flexibilizing additives.

Epoxy plasticizers include epoxy compounds of fatty oils and their acids. Epoxy novolac resins and cycloaliphatic epoxies are other illustrative members of the epoxy resin group. Polyamids and acid anhydrides may also be used as curing agents.

A limit of 10% elongation at break is a reasonable top limit to characterize rigid epoxy resins. Higher elongation values indicate flexibility to a greater or lesser degree, and characterize flexible epoxy resins.

Example 4 illustrates a rigid epoxy composition for the backing component.

EXAMPLE 4:

Epoxy Resin composition for backing component.

A suitable composition has the following weight parts: EPON Resin 828 100 parts, Epoxide No. 7 (Procter & Gamble) 5 parts, 325 mesh silica 100 parts, 60 mesh silica 100 parts, diethylenetriamine 10 parts, totaling 315 parts. A small quantity of Cab-O-Sil can be added to regulate viscosity and drainage time. This additive increases viscosity and decreases drainage time on vertical surfaces. The composition of this example is suitable for fiberglass reinforced applications.

The backing component may advantageously be reinforced by fibrous materials. Fiberglass illustrates such fibrous materials. Fiberglass reinforcements are supplied as continuous strands, fabrics, mats, chopped strands, and other forms. Other useful fibrous reinforcements may include sisal, cotton, jute, asbestos, synthetic fibers, and metallic fibers, amongst others. Suitable aftertreatment of fiberglass fibers, prior to their application in the instant invention, may be advantageous to improve their processing characteristics, including their ease to be wetted by resins. Treatment with chromium compounds and with silanes (silicones) illustrates aftertreatment methods.

Fiberglass is a suitable illustration for fibrous reinforcement. It can be applied by a number of processes. Suitable application methods are, for instance, the ones known as hand lay-up method, spray-up method and centrifugal casting method. For each particular method the glass fibers are selected in a proper form. For instance, continuous roving can be used with spray-up and centrifugal casting, and mats, fabrics, woven rovings can be used for hand lay-up. In one application method chopped strands and the polyester composition are sprayed simultaneously from a special gun, depositing both the fiberglass and the polyester resin composition in proper proportion on the interior surface of the outer shell component, that is the facing component. In another application method the chopped strands are preimpregnated with the resinous composition and jointly applied. This requires a dispersion of the chopped strands in the resinous composition. In the hand lay-up method the polyester composition is applied first by brushing or spraying and the fiberglass can then be applied as a mat by hand and rolled over by a special roller to remove air pockets. This is followed by another coat of the polyester composition. In still another method the chopped strands are distributed by a suitable method over the surface of the freshly applied resinous composition, for instance, by the aid of a blow gun and this step is followed by an additional application of the polyester composition.

What is stated above for rigid polyester compositions applies also for rigid epoxy resin compositions. The former are preferred because of their faster setting and curing time, particularly where fibrous reinforcement is also utilized. Combinations and modifications of the above outlined illustrative methods are used where special circumstances require such changes.

Whereas unfilled rigid polyester and epoxy resins can be used to form the backing component according to this invention, filled compositions are preferred.

The fillers reduce shrinkage during curing and have other additional advantages. Silica (flint) illustrates a suitable filler. 325 and 60 mesh qualities are presented in the illustrative examples. When 60 mesh silica is used, the composition may require the use of a special type of spray gun, on account of the large particle size of some of the filler particles.

The backing components here above listed are not equivalent. The most preferred backing components are the reinforced rigid polyesters, followed by the reinforced rigid epoxy resins. In most cases they do not require ancillary reinforcing elements. The others follow in the order of declining preference, as follows: rigid nonreinforced polyesters, rigid non-reinforced epoxy resins, compositions containing fillers bound by elastomer latex solids, asphalt and plaster of paris. The latex type compositions require evaporation of water during manufacturing. Asphalts are frequently sensitive to heat and require the additional use of an ancillary reinforcing element. The plaster of paris containing tiles require in many cases an ancillary reinforcing element to improve their resistance to impact.

The above listing of suitable backing components of the composite tiles of this invention are intended for illustrative purposes and do not intend to limit the herein claimed invention.

IMPROVING ADHESION BETWEEN THE FACING AND BACKING COMPONENTS.

In many instances it is advantageous to apply an adhesive as an intermediate layer between the facing and backing components. This is particularly true when the facing component is derived from plastisol and the backing component comprises a rigid polyester.

Neoprene adhesive illustrates a suitable adhesive. A neoprene cement is diluted, for example, with methylethyl ketone in the proportion of 20% cement and 80% solvent. This solution may be applied by slush casting or spraying, depending on the conditions of the manufacturing method used. For individual purposes suitable adhesives may be selected from the group of resorcinol adhesives, rubber emulsions, rubber solutions (cements), epoxy resins, special polyester resins, latex adhesives, latex modified cements, hot asphalt adhesives, amongst others.

Other adhesives suitable for individual purposes are: (1) Solutions of VINYLITE Resin VAGH in solvents, as in methylethyl ketone, or in mixtures of toluene and methylethyl ketone. This is a copolymer of vinyl acetate, vinyl chloride and vinyl alcohol, and is compatible with alkyd resins and polyesters. (2) Polyurethane adhesives of the 2 part and 1 part systems. (3) An adhesive containing vinyl resins, methylethyl ketone, dioctyl phthalate and methylene-bis(4-phenyl isocyanate). (4) Nitrile rubber adhesives. (5) Nitrile-phenolic adhesives as discussed on Page 490, Col. 2, Par. 6 of Handbook of Adhesives, by Irving Skeist, Reinhold Publishing Corp., 1962/64. See also pages 236 to 241 of same publication.

According to one embodiment of this invention, improved adhesion can be achieved by the application of a joint "contact resin" ingredient being simultaneously present in the facing component and the backing component. This contact resin is compatible with the composition of both components and its simultaneous presence promotes the adhesion of the two components, thereby eliminating the need for a special adhesive layer placed between them. A peracetic epoxy resin is a suitable illustration. BAKELITE Epoxy Resin ERL-4289 is bis(4,4-epoxy-6-methylcyclohexylmethyl) adipate. In one step 20 phr (parts per hundred resin) of this peracetic epoxy resin is incorporated into the plastisol composition and borontrifluoride-monoethylamine is added thereto in a proportion of 2% additive based on the weight of the epoxy resin. This plastisol compound is then molded at about 275° F. for a time sufficient to gel, but not to fuse the plastisol. The mold is opened and the rigid polyester forming composition is applied. The polyester composition contains about 10% of the peracetic epoxy resin ERL-4289 based on the weight of the polyester resin. The curing is then continued to complete the fusion of the plastisol component and the setting and polymerization of the rigid polyester containing backing component. This process results in a satisfactory adhesion between the two components, however, it is not suitable for facings which have undercuts that make removal from the mold difficult after rigidification.

ANCILLARY REINFORCING ELEMENTS

With the manufactured composite tiles of this invention it is in many cases useful and desirable to apply an ancillary reinforcing element as an additional layer behind the backing component. Such ancillary reinforcing elements improve the resistance of the composite tile to strong stresses, pressures or impact. They assist the rigidifying action of the backing component and toughen the manufactured composite tile. The ancillary reinforcing element may be of metal, paper chipboard, cardboard, cement board, plaster board, Masonite, or of a synthetic resin layer, amongst other suitable materials. The element may be continuously or discontinuously applied to the rear surface of the backing component. When it is to be continuous and is liquid at the time of application, it may be applied by casting, such as slush casting and rotational casting. Low melting point metal alloys, used as ancillary reinforcing elements, may be applied by casting. The same applies to the suitable synthetic resin compositions, illustrated by flexible polyester resins and essentially flexible epoxy resins. Rigid plastics foams may also be utilized as ancillary reinforcing elements. These are illustrated by rigid polyurethane foams. The foam can form either a layer on the entire rear surface of the backing component or fill only joint cavities formed by the facing and backing components in the position of textured areas. The foams are advantageously applied by the foam-in-place method, wherever other conditions permit such an application.

Some of the favored ancillary reinforcing elements of this invention are the flexible epoxy resins and flexible polyester resins. The flexible epoxy resins are preferred for this purpose. They can be applied in many cases by slush casting and they set overnight at room temperature to a sufficient degree so that the tiles can be handled. Completion of the polymerization to the desired degree is achieved in an additional few days during room temperature storage. The epoxy layers are very tough. Example 5 illustrates a flexible epoxy resin composition suitable as ancillary reinforcing element.

EXAMPLE 5:

Epoxy Resin composition for ancillary reinforcing elements.

A flexible epoxy resin composition is prepared of the following ingredients: 15.05% EPON Resin 871, 15.05% EPON Resin 828, 6.15% Epoxide No. 7 (an epoxy plasticizer of Procter & Gamble), 30.20% of 325 mesh grade silica, 30.20% of 60 mesh grade silica, 3.00% of diethylenetriamine (DTA) and 0.35% of Cab-O-Sil, totaling 100%. The nature of some of the ingredients are described further above in this specification. The Cab-O-Sil regulates viscosity, flow and stoppage of flow. EPON Resin 871 comprises unsubstituted 2,3-epoxyalkyl esters of mixtures of dimer and trimer fatty acids having 12–30 carbon atoms.

An illustration of desirable thickness for the resinous ancillary reinforcing elements is from about 15½ mils to about 250 mils. Many of the resinous compositions can be applied by spraying. When the backing component is a resinous material, useful proportions between the thicknesses of the resinous backing component and of the resinous ancillary reinforcing element are between a proportion of 1:1 and a porportion of 1:3. These proportions and thickness ranges are illustrative and are not given to limit the scope of the claimed invention.

When the ancillary reinforcing element is a prefabricated board or sheeting, the application of an adhesive may be required to achieve proper adhesion between said board or sheeting and the rear surface of the backing component.

A fiberglass reinforced rigid polyester composition may also be used as an ancillary reinforcing element.

METHODS OF MANUFACTURE AND DRAWINGS

The tiles of this invention can be manufactured by various methods and process steps. Without limiting the scope of the invention herein claimed, four processes will be listed for the purposes of illustration.

Method 1:

A facing component is premolded. It has a front surface, a back surface and sidewalls. The composition forming the backing component is deposited in a liquid state in the cavity of the facing component which has sidewalls. Casting, such as slush, casting, is a suitable method of deposition. No supporting mold is required during the application and solidification of the composition forming the backing component. FIG. 11 illustrates a tile made by this method.

Method 2:

In this method a tile press, suitable for making ceramic tiles, is used. The facing component and the backing component are formed in the same equipment in subsequent steps. FIG. 4 illustrates the equipment for this process. This method is applicable to the production of tiles with facing components prepared from prefabricated sheetings, among others.

Method 3:

The facing component in this method is prepared with a marginal area not covered by the backing component. The facing is placed in a holder, illustrated by FIG. 7 and FIG. 8. The marginal area of the preformed facing component assists in holding the latter in position during the application of the composition forming the backing component.

Method 4:

This method is related to Methods 1 and 3. The facing component has sidewalls in addition to its front surface and back surface. With its sidewalls this type of facing component forms a cavity. The facing component is premolded in a holder illustrated by FIG. 8A. The holder also permits keeping the facing component in a supporting mold during the formation of the backing component. The mold may be the same as used to premold the facing component.

In contrast to the products of my parent applications the tiles of the instant invention are substantially flat objects. Their predominant dimensions are length and width and they have a relatively low height or thickness. For this reason the sidewalls of the facing component, whenever such sidewalls exist, are low. The preferred thickness of the tiles is from about ¼ inch to about 1 inch. In some instances the thickness may be as low as ⅛th of an inch and as high as about 2 inches.

Methods of molding the compositions forming the facing component have been discussed further above. Depending on the composition selected the methods of premolding may vary greatly. Slush casting, calendering, vacuum forming are some of the methods which can be utilized. The compositions forming the backing component are advantageously applied from a liquid state. They can be applied by pouring, slushing, spraying, knife coating, troweling, amongst others. If the composition forming the backing component is thermoplastic, the application may be from solid state, such as from powder, and pressure combined with elevated temperatures may be used for the formation.

In forming the backing component, a retaining sidewall is used. This can be formed by the facing component itself and remain a part of the tile so formed, or it may be created by a mold that is removable after the composition forming the rigidifying backing component sets to a solid.

FIGS. 1, 2 and 3 illustrate the cross-sectional views of molds 25 suitable to form facing components. They are electroformed molds, and are suitable to form plastisol into tile or panel shapes. FIG. 1 shows, additionally, a facing component 26 formed in the mold 25. The front surface of the facing components formed in these molds are textured. The facing component produced in the mold of FIG. 1 is suitable for Method 1, described above. After the facing component is removed from the mold the backing component may be formed in the facing component having sidewalls. The composition forming the backing component by this method is applied from a liquid state.

FIG. 4 illustrates the cross-sectional view of a tile press and tile die. The die is mounted in the special tile press. The press may be operated by hydraulic pressure or other means. The sides 29 of the die are fastened to the press. The bottom platen 30 of the die rests on the bottom plate 48 of the die 49 which in turn rests on the bed of the press. The top platen 28 of the die is attached to a shaft 27. This shaft 27 is attached to the drive of the press and is able to move up and down. The material to be molded into the facing component is placed on the top surface of the bottom platen 30. After the material to be molded is in place, the top platen 28 is lowered by means of the shaft 27, thus applying pressure on the material. This pressure compacts or presses the material into its desired shape, and forms the premolded facing component 26. The die may be heated, if so desired. Depending on the pressures and molding temperatures applied, the material to be molded may be a liquid, like plastisol, may be a powder, like polyethylene, may be granules or be a prefabricated sheeting. After the molding is completed, the top platen is withdrawn upward and the bottom platen is pushed up by the aid of shaft 31 until the facing component 26 is free of the sides 29 of the die. The facing component is then stripped from the bottom platen. In an alternative of this method the top platen 28 is withdrawn after molding of the facing component is completed; the composition forming the backing component is then applied in a liquid or powdery state to the rear surface of the premolded facing component while the latter is still in its original position. The top platen 28 then descends again and forms the backing component behind the rear surface of the facing component. Temperatures and pressures are adjusted to yield the desired results with the particular composition selected to form the backing component. FIG. 4 shows the so formed backing component 32. If so desired, an adhesive can be sprayed on or applied by a suitable means to the rear surface of the premolded facing component, prior to applying thereto the composition forming the backing component. Neoprene adhesive is a suitable illustration if the facing component is made of plastisol and the backing component is made of a rigid polyester. After the setting of the backing component is completed the upper platen is raised and the lower platen is pushed up to facilitate removal of the tile from the die.

FIG. 5 is the cross-section of the tile removed from the die of FIG. 4. 26 is the facing component and 32 is the backing component.

FIG. 6, is the cross-section of a facing component prepared in a die similar to that of FIG. 4. 26 is the facing component. 33 is an extension portion of the facing component useful in the method illustrated by FIGS. 7, 8 and 9. This extension portion is removed after the backing component has been applied.

FIG. 7 is a planar view of a holder frame, showing sides 35 holding the facing component 26. The sides are held in place by fasteners 36, such as nuts and bolts.

FIG. 8 is a cross-sectional view of the holder illustrated by FIG. 7 holding the facing component illustrated by FIG. 6. 35 designates the four sidewalls of the holder. 35 reaches over the extensions 33 of FIG. 6 and holds the facing component in position. 26 is the facing component. 36 designates the fasteners of the holder. 34 is a bottom rest for the facing component and is a part of the equipment. The sides 35 form a type of a wall permitting the application of the composition forming the backing component by slush casting. If an ancillary reinforcing element is to be applied, which can be slush cast, the composition forming the ancillary reinforcing element can also be applied by using the equipment illustrated by FIG. 8. There are four holder sides 35 in this equipment and the sides can be made, for instance, of wood or metal. 32a is the same as in FIG. 9.

FIG. 9 illustrates a cross-sectional view of the facing and backing produced in the holder equipment of FIG. 8. 26 is the facing component. 33 is the same as in FIG. 6. It is not rigidified by the backing component and is removed by trimming. 32a is the backing component applied in a fluid state. Section line *a* is where the trimming is performed. Rigid polyester and rigid epoxy resin compositions are examples of suitable materials for forming the backing component by this method.

FIG. 10 is the cross-section of a tile produced in the equipment illustrated by FIGS. 7 and 8. 32a is the backing component formed from a fluid state. 26 is the facing component. The non-backed portions of the facing have been removed by trimming. 37 is an ancillary reinforcing element formed from fluid state in the equipment of FIGS. 7 and 8. A flexible epoxy resin composition is an example for such element. The rear surface of the tile may be ground to a flat surface. The composition forming the ancillary reinforcing element is poured into the cavity formed by the holder sidewalls and the rear surface of the backing component.

FIG. 8A is the cross-section of a multi-piece mold with clamps 44. The mold sides 45 are removable. There are four such sides. 46 is the mold bottom. As an alternative, the mold may be a two-piece mold in which case there is a split in the center area of 46. Facing component 26 is slush cast and has sidewalls in addition to its facing portion. 32a is a slush cast backing component. FIG. 24 shows a tile which can be made in a similar equipment to that shown in FIG. 8A. The application of a mold release agent on the mold enhances ease of removal of the articles produced therein. A silicone mold release illustrates such a product. This figure illustrates equipment suitable for carrying out Method 4 of the manufacturing process discussed further above. It may be stated, that various alternative steps are available. In one such alternative, the facing component is made by pouring and therefore does not form sidewalls. The same applies to the composition forming the backing component. If an ancillary reinforcing element is to be formed from a composition being in a fluid state, the said element can also be formed in the equipment of this figure.

FIG. 11 is the cross-section of a tile produced with the facing component premolded in the mold of FIG. 1. The facing is first formed in the mold of FIG. 1. Then the composition forming the backing component is applied from fluid state by, for instance, slush casting. The backing component is formed in the facing component without the use of a supporting mold. This is made possible by the shape of the facing component which has low sidewalls. 26 is the facing component and 32a is the backing component formed from a fluid composition. Section "14" shows the position of cut made for FIG. 14.

FIG. 12 is the cross-sectional view of a tile similar to that illustrated in FIG. 11, where, however, an ancillary reinforcing element 37 is applied. The composition forming the ancillary reinforcing element is applied from fluid state by pouring. A flexible epoxy resin composition illustrates a suitable material for this purpose. 26 and 32a have the same meaning as in FIG. 11. Section "13" is the position where the cut is made for FIG. 13.

FIG. 13 is the same as FIG. 12 with the difference, that at position "13" of FIG. 12 the tile has been cut and/or ground flat, thus producing the tile of FIG. 13.

FIG. 14 is the same as FIG. 11 with the difference, that at position "14" of FIG. 11 the tile is cut and/or ground flat, thus producing the tile of FIG. 14.

FIG. 15 is the tile of FIG. 14 with the additional feature that as an additional layer a prefabricated board 38 is applied as an ancillary reinforcing element. The board may be cement board, plywood, chipboard, amongst others. 39 is an adhesive layer providing adhesion between the board and the backing component.

FIG. 16 shows the cross-sectional view of a tile where the facing component has been prepared in the mold of FIG. 2 with a backing component 32a. The composition forming the backing component is applied from fluid state. The rear surface of the backing component is cut and/or ground smooth. 26 is the facing component.

FIG. 17 shows the cross-sectional view of a tile with a facing component premolded in the mold of FIG. 2. 26 is the facing component. 32a is a backing component. The composition producing the backing component is applied in a fluid state and does not fully fill the cavity formed by the texture of the facing component. The remaining cavity jointly formed by the facing component and the backing component is then filled with a rigid polyurethane foam 42 as an ancillary reinforcing element. The rigid polyurethane foam is applied from a fluid state and is foamed-in-place. The crest points of the rear surface of the facing component and the rear surface of the foam are ground smooth, an adhesive 39 is applied and a board 38 is applied to the rear surface. As an alternative to the product illustrated by FIG. 17, the joint cavity may be left unfilled and the adhesive applied only to the crests of the rear surface of the facing component. The board is applied as the last step in both alternatives.

FIGS. 18 and 21 are planar views of the facing of two tiles with raised scupltured effects of texture. In both figures, 26 is the facing, and 40 is a protuberance indicating the raised scupltured texture of the facing. 40 may have undercuts. Section "19" in FIG. 18 shows the position of a cut taken for the cross-section illustrated by FIG. 19. Section "22" in FIG. 21 shows the position of a cut taken for the cross-section illustrated by FIG. 22.

FIGS. 19 and 20 are two alternative cross-sections of tiles taken at position "19" of FIG. 18. 26 is the facing component. 32-a is the backing component formed from a fluid state. 40 is the sculptured raised texture of the facing of the tile. In FIG. 20 39 is an adhesive layer and 38 is a board applied as an ancillary reinforcing element. It should be noted that 40 is a part of 26.

FIGS. 22 and 23 are two alternative cross-sections of tiles taken at position "22" of FIG. 21. 26 is the facing component. 32a is the backing component formed from a fluid composition. In the protuberance area 40 of the textured surface of the facing component a hollow 43 is formed in a discontinuous manner. 41 in FIG. 22 is the rear surface of the backing component ground to a smooth surface. In FIG. 23 a board backing 38 is applied as an ancillary reinforcing element with the aid of the adhesive 39. In an alternative of either one of these two tiles the hollow cavity 43 may be filled with a rigid polyurethane foam formed from a fluid composition by the foam-in-place method.

FIG. 24 is another example of a tile. 26 is the facing component. 32-a is a backing component formed from a fluid composition. The facing and backing component form a joint cavity. A rigid polyurethane foam 42 fills out the said cavity.

In FIG. 7 33 is the same as in FIG. 6. In FIG. 8a 39 is an adhesive. The use of the adhesive is optional.

It should be noted that whereas FIG. 8 is a cross-sectional view of FIG. 7, the latter does not show the backing component 32a.

The election of the manufacturing method to be used for a particular tile of this invention depends on the materials chosen for the components. This includes the election whether a supporting mold should be present during the formation of the backing component.

Rigid foams have been discussed further above as rigidifying components of the herein claimed rigid tiles. One of the interesting embodiments of rigid foams are polystyrene rigid foams. These are discussed in detail in my prior application Ser. No. 523,778, now U.S. Pat. No. 3,419,455, in my applications Ser. No. 760,415, which has been continued by copending applications Ser. No. 141,481 and 142,037 (now U.S. Pat. 3,703,571) Ser. No. 760,415 is a continuation of U.S. Pat. No. 3,419,455. Polystyrene rigid foams are discussed in Ser. No. 141,481 under the heading of "THE INNER RIGIDIFIER COMPONENT", under the subtitle: "(2) Polystyrene Rigid Foams:". Essentially polystyrene beads are used which contain volatile materials encapsulated therein. The latter cause foaming upon heating. The beads can be partially pre-expanded. Polystyrene Rigid Foams are dealt with in detail in the book of T. H. Ferrigno, "RIGID PLASTICS FOAMS", Reinhold Publishing Corporation, New York, N.Y. 1963., to which reference was made in my said earlier U.S. Pat. No. 3,419,455 and said copending applications Ser. Nos. 141,481 and 142,037 (now U.S. Pat. No. 3,703,571).

One of the important embodiments of the herein claimed process is the utilization of a pliable plastics material comprising an acrylic monomer in a polymerized state. Acrylic monomers in a polymerized state are discussed in this specification under the heading "THE FACING COMPONENT" as Example A, and under the heading "THE FACING COMPONENT." Acrylics are discussed in detail also under the heading of "THE BACKING COMPONENT". They are also well known in the art.

As indicated above, molding of the facing component can be performed, for example, by calendering and embossing.

The facing components of the herein claimed tile have a wall thickness of from about 15½ mils to about 250 mils. These limits are not arbitrary but are required by the success of the process. If the wall thickness is higher than the top limit, it is difficult to remove the facing component from its mother mold. This difficulty is aggravated when the molded texture has several undercuts. On the other hand, if the wall thickness is too low, the facing component deforms or even wrinkles while the rigidifier backing component is applied and set. Such deformation cannot be prevented even in cases where a supporting mold is present during the application of the composition forming the backing component. Reference is made to portions of my earlier patents and applications wherein the wall thickness is discussed. As explained for example in U.S. Pat. No. 3,414,456, the backing component (flesh portion) improves the resistance to cold flow or heat distortion. Also, the backing component rigidifies the shell component to reduce flexibility of the latter. The skin materials protect the rigidifier flesh portion (backing component) from fracture. This mutual improving effect is synergistic. It is obvious that when the facing component is too thin it cannot perform its intended function, such as preventing the fracturing of the backing component. The backing component of the tiles herein claimed are plastic materials solidified from a fluid state in adherent contact with the entirety of the rear surface of the facing component.

1. A rigid composite impact resistant tile comprising a facing component and a backing component, the facing component being a premolded pliable organic plastic material having a textured front surface and a wall thickness ranging from about 15½ mils to about 250 mils, the backing component being a rigid structural member that is in supporting relationship to the facing component, rigidly maintaining the latter in its premolded shape, said backing component being solidified from a fluid state in intimate adherent contact with the entire rear surface of the facing component, said composite tile having a thickness of from about 1/16 of an inch to about 2 inches, said facing component, when free of the backing component, being itself at least temporarily deformable by hand pressure and being essentially void-free and having been premolded to its final shape and its final and textural characteristics, said premolded textured front surface of the facing component having a texture which embodies in a positive form the texture of its negative mother mold, wherein the completed tile is free of composite sidewalls at its extremities that would have rear surfaces which would define a cavity with the rear surface of the composite front wall of the tile, and wherein the backing component comprises a plastic material which is a member of the class consisting of (a) a rigid polyester composition, (b) a rigid epoxy resin composition, (c) a rigid elastomer composition comprising a filler and an elastomer, wherein there is at least about 200 weight parts of filler for each 100 weight parts of elastomer, (d) a rigid thermosetting plastic foam composition in a thermoset state, and (e) asphalt, said polyester composition comprising the condensation product of a dibasic acid and a diol and also comprising a cross-linking monomer reactant in a crosslinked state.

2. The rigid composite tile of claim 1, wherein the backing component is solidified from a liquid.

3. The rigid composite tile of claim 1, wherein there is an adhesive layer between the two components.

4. The rigid composite tile of claim 1, wherein the facing component is a premolded thermoplastic plastic material.

5. The rigid composite tile of claim 1, wherein the facing material is characterized by the presence of vinyl chloride in a polymerized and plasticized state.

6. The rigid composite tile of claim 1, wherein the facing component comprises ethylene in a polymerized state.

7. The rigid composite tile of claim 1, wherein the facing component is characterized by the presence of a member of the class consisting of homopolymers of ethylene, homopolymers of propylene, copolymers of ethylene and propylene, and copolymers of ethylene with unsaturated esters.

8. The rigid composite tile of claim 1, wherein a board is adherently attached to the rear surface of the backing component as an ancillary reinforcing element.

9. A rigid composite impact resistant tile comprising a facing component and a backing component, the facing component being a premolded pliable organic plastic material having a textured front surface and a wall thickness ranging from about 15½ mils to about 250 mils, the backing component being a rigid structural member that is in supporting relationship to the facing component, rigidly maintaining the latter in its premolded shape, said backing component being solidified from a fluid state in intimate adherent contact with the entire rear surface of the facing component, said composite tile having a thickness of from about 1/16 of an inch to about 2 inches, said facing component, when free of the backing component, being itself at least temporarily deformable by hand pressure and being essentially void-free and having been premolded to its final shape and its final physical and textural characeristics, said premolded textured front surface of the facing component having a texture which embodies in a positive form the texture of its negative mother mold, wherein the completed tile is free of composite sidewalls at its extremities that would have rear surfaces which would define a cavity with the rear surface of the composite front wall of the tile, and wherein the backing component comprises plaster of parts.

10. A rigid composite impact resistant texturally decorated tile comprising a facing component, a backing component and an ancillary reinforcing element, said facing component being a premolded pliable organic plastic material having a textured front surface, a nonplanar back surface that follows the contour of the textured front surface in at least a dulled manner and said facing component having a wall thickness ranging from about 15½ mils to about 250 mils, the backing component being a rigid structural member that is in supporting relationship to the facing component, rigidly maintaining the latter in its premolded shape, said backing component being a plastic material solidified from a fluid state in intimate contact with the entirety of the rear surface of the facing component, said composite tile having a thickness of from 1/16th of an inch to about 2 inches, said facing component, when free of the backing component, being in itself at least temporarily deformable by hand pressure, being essentially void-free and having been premolded to its final shape and its final physical and texturally decorative characteristics, said backing component being by itself more fragile than the completed composite tile, said ancillary reinforcing element being adherently attached to the rear surface of the backing component in a supporting position, thereby improving the resistance of the tile to impact, said premolded textured front surface of the facing component having a texture which embodies in a positive form the texture of its negative mother mold, wherein the completed tile is free of composite sidewalls at its extremities that would have rear surfaces which would define a cavity with the rear surface of the composite front wall of the tile, and wherein the ancillary reinforcing element comprises a member of the class consisting of a flexible epoxy resin composition and a flexible polyester composition.

11. A rigid composite impact resistance tile comprising a facing component and a backing component, the facing component being a premolded pliable organic plastic material having a textured front surface and a wall thickness ranging from about 15½ mils to about 250 mils, the backing component being a rigid structural member that is in supporting relationship to the facing component, rigidly maintaining the latter in its premolded shape, said backing component being solidified from a fluid state in intimate adherent contact with the entire rear surface of the facing component, said composite tile having a thickness of from about 1/16 of an inch to about 2 inches, said facing component, when free of the backing component, being itself at least temporarily deformable by hand pressure and being essentially void-free and having been premolded to its final shape and its final physical and textural characteristics, said premolded textured front surface of the facing component having a texture which embodies in a positive form the texture of its negative mother mold, wherein the completed tile is free of composite sidewalls at its extremities that would have rear surfaces which would define a cavity with the rear surface of the composite front wall of the tile, and wherein the plastic material of the backing component is a fiber reinforced rigid epoxy resin composition.

12. A rigid composite impact resistant tile comprising a facing component and a backing component, the facing component being a premolded pliable organic plastic material having a textured front surface and a wall thickness ranging from about 15½ mils to about 250 mils, the backing component being a rigid structural member that is in supporting relationship to the facing component, rigidly maintaining the latter in its premolded shape, said backing component being solidified from a fluid state in intimate adherent contact with the entire rear surface of the facing component, said composite tile having a thickness of from about 1/16 of an inch to about 2 inches, said facing component, when free of the backing component, being itself at least temporarily deformable by hand pressure and being essentially void-free and having been premolded to its final shape and its final physical and textural characteristics, said premolded textured front surface of the facing component having a texture which embodies in a positive form the texture of its negative mother mold, wherein the completed tile is free of composite sidewalls at its extremities that would have rear surfaces which would define a cavity with the rear surface of the composite front wall of the tile, and wherein the plastic material of the backing component is a fiber reinforced rigid polyester composition, said polyester composition comprising the condensation product of dibasic acid and a diol and also comprising a cross-linking monomer in a cross-linked state.

13. A rigid composite impact resistant tile comprising a facing component and a backing component, the facing component being a premolded pliable organic plastic material having a textured front surface, a back surface that follows the contour of the texture of the front surface in at least a dulled manner, and a wall thickness ranging from about 15½ mils to about 250 mils, the backing component being a rigid structural member that is in supporting relationship to the facing component, rigidly maintaining the latter in its premolded shape, said backing component being solidified from a fluid state in intimate adherent contact with the entire rear surface of the facing component, said composite tile having a thickness of from about 1/16th of an inch to about 2 inches, said facing component, when free of the backing component, being itself at least temporarily deformable by hand pressure and being essentially void-free and having been premolded to its final shape and its final physical and textural chracteristics, said premolded textured front surface of the facing component having a texture which embodies in a positive form the texture of its negative mother mold, wherein the completed tile has composite sidewalls at its extremities that have rear surfaces which define a cavity with the rear surface of the composite front wall of the tile.

14. The rigid composite tile of claim 12, wherein a board is adherently attached to the rear surface of the backing component as an ancillary reinforcing element.

15. A rigid textured composite impact resistant hollow tile comprising an outer premolded facing component of a preset shape and a backing component, the facing component being a pliable organic plastic material having an outer textured front surface and inner walls, and a wall thickness ranging from about 15½ mils to about 250 mils, said facing component having an excess opening formed therein, said facing component enclosing an internal cavity defined by said inner walls accessible through said opening, and said backing component being a rigid structural member that is in supporting relationship to the facing component, rigidly maintaining the latter in its premolded shape, being solidified from a fluid state within said internal cavity and in intimate adherent contact with the entire inner surface of said walls of the facing component, said composite tiles having a thickness of from about 1/16th of an inch to about 2 inches, said facing component, when free of the backing component, being itself at least temporarily deformable by hand pressure and being essentially void-free and having been premolded to its final shape and its final physical and textural characteristics, said premolded textured front surface of the facing component having a texture which embodies in a positive form the texture of its negative mother mold, wherein the composite tile has sidewalls at its extremities that define a cavity with the front wall of the tile, said cavity being jointly formed by the facing and backing components.

16. A rigid composite impact resistant texturally decorated tile comprising a facing component and a backing component, the facing component being a premolded organic plastic material having a textured front surface, a non-planar back surface that follows the contour of the textured front surface in at least a dulled manner and a wall thickness ranging from about 15½ mils to about 250 mils, the backing component being a rigid structural member that is in supporting relationship to the facing component, rigidly maintaining the latter in its premolded shape, said backing component being a plastic material solidified from a fluid state in intimate adherent contact with the entirety of the rear surface of the facing component, said composite tile having a thickness of from 1/16th of an inch to about 2 inches, said facing component, when free of the backing component, being in itself at least temporarily deformable by hand pressure, being essentially void-free and having been premolded to its final shape and its final physical and textural characteristics, said backing component being by itself more fragile than the completed composite tile, said premolded textured front surface of the facing component having a texture which embodies in a positive form the texture of its negative mother mold, wherein the completed tile has composite sidewalls at its extremities that have rear surfaces which define a cavity with the rear surface of the composite front wall of the tile.

17. The rigid composite impact resistant texturally decorated tile of claim 16, wherein there is additionally present as a component an ancillary reinforcing element.

* * * * *